D. W. McLAUGHLIN.
TRACTION WHEEL.
APPLICATION FILED MAY 26, 1913.
1,190,183. Patented July 4, 1916.
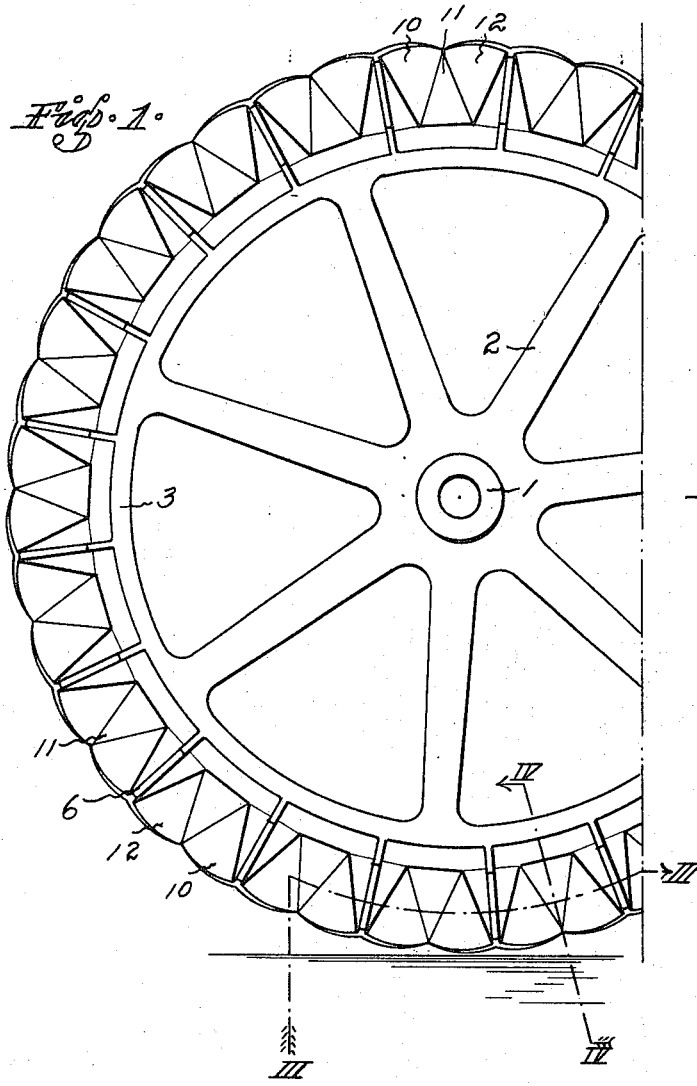
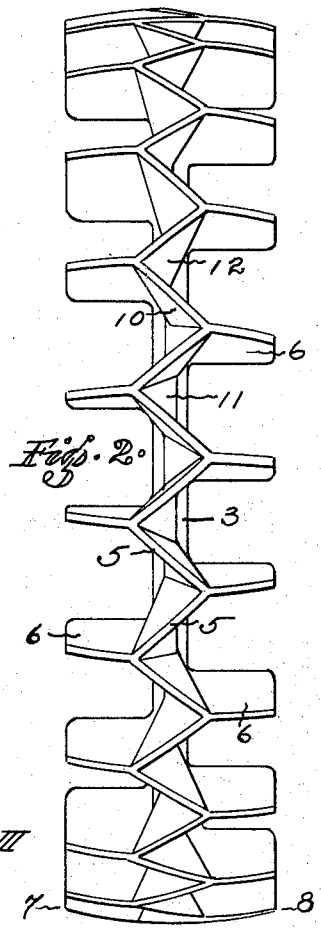
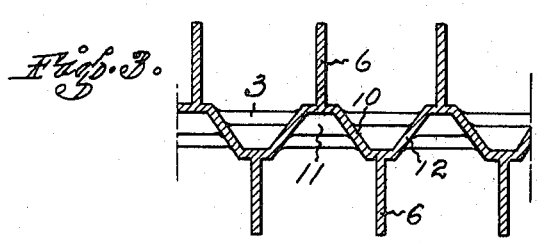
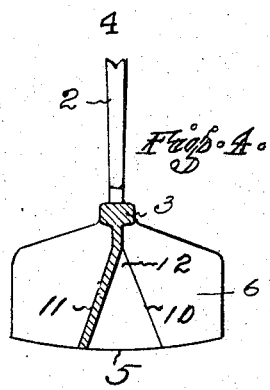
WITNESSES:
INVENTOR.
ATTORNEY.

UNITED STATES PATENT OFFICE.

DENNIS W. McLAUGHLIN, OF BERKELEY, CALIFORNIA.

TRACTION-WHEEL.

1,190,183.  Specification of Letters Patent.  Patented July 4, 1916.

Application filed May 26, 1913. Serial No. 769,832.

*To all whom it may concern:*

Be it known that I, DENNIS W. McLAUGHLIN, a citizen of the United States, and a resident of the city of Berkeley, county of Alameda, State of California, have invented new and useful Improvements in Traction-Wheels, of which the following is a specification.

This invention relates to improvements in tractors and more particularly to traction wheels.

Among the objects of this invention are: to increase the tractive efficiency of wheels for tractors, particularly in soft ground: to increase the traction efficiency without sacrificing the supporting qualities of the wheel tread; to produce a wheel tread that will sustain the weight of the tractor on a finished road surface, without injury to the road surface and retain the maximum tractive efficiency on hard or soft ground; to produce a self cleaning tread neat in appearance, cheap in manufacture, and preferably composed of an integral whole.

Other objects and advantages will appear as the invention is disclosed in the following description devoted to the preferred form for putting this invention into practice.

The invention possesses other advantageous features which with the foregoing, will be set forth at length in the following description, where I shall outline in full that form of invention selected for illustration in the drawings accompanying and forming part of the present specification. The novelty of the invention will be included in the claims succeeding said description. From this, it will be apparent that I do not restrict myself to the showing made by said drawings and description, as I may adopt many variations within the scope of my invention as expressed in said claims.

In small tractors ranging in weight from a ton upward, the weight is not sufficient to give the necessary tractive efficiency on a plain tread, particularly in soft ground such as fields in cultivation. The use of "growsers" or the like on the tread is prohibitive because of the injury such aids to traction do to road surfaces. A tread constructed in accordance with this invention will give the maximum tractive efficiency under all consistent soil conditions, without marring road surfaces or sinking deeply into loose or soft ground.

In the drawings: Figure 1 is a side elevation of a tractor wheel constructed in accordance with this invention, a portion of the wheel tread being broken away. Fig. 2 is a front elevation of the same, partially in cross section to disclose the conformation of the web of the tread. Fig. 3 is a peripheral cross section taken on the line III—III looking toward the hub of the wheel. Fig. 4 is a fragmentary detail in vertical cross section on the line IV—IV.

In detail the construction consists of the hub 1, adapted to be journaled or fixed upon the axle of the tractor in accordance with the type of propelling transmission used. The spokes 2, radiate from the hub to the rim 3: the number of spokes and the strength of the rim are proportioned to the load to be imposed upon the wheel.

The circumferential line of the wheel is preferably truly concentric with the hub, while the line of the tread zig zags back and forth across the plane line 4 of the tread, presenting the angular transverse edges 5 to the ground in succession. The point of conjunction of the edges 5 form the apex of open triangles, alternately facing in opposite directions; from each apex is extended a lateral plane, the edge 6 of which converts each open triangle into a Y shape. The visible track left by this tread shows a series of alternately reversed Y's. The lateral plane of the tread from 7 to 8 is an arc with its radial center approximately in the axis of the wheel; although this sweep of the arc is not arbitrary and should vary with the load, tractive duty, surface conditions, etc., affecting the wheel specifications. This lateral arc of the tread shows the tail 6 of the Y to be elevated above the road plane.

On a very hard surface such as asphalt or concrete roads, only the extreme periphery of the wheel will be in contact, this will confine the tractive effort to the V of the open triangle; in proportion as the tread sinks into a softer surface more tractive and more supporting area will come into play. The "zig zag" tread is conceded in this art to give the maximum tractive efficiency, particularly when augmented by the lateral extensions 6.

In very soft ground the tread will sink in proportion to the supporting quality of such ground, the planes 6 engaging the ground in a paddle like manner to prevent slipping of the traction wheels insuring the progress of the tractor; whereas under similar conditions a flat tire will slip and if armed with growsers will soon "bury the wheels" if power is applied. To increase the supporting power of the tread, in addition to the tractive elements previously described, a series of peculiarly interrelated and combined inclined triangular planes are interposed between the circumferential edge and the rim of the wheel. For many and obvious reasons it is desirable that both sides of the wheel be identical and that the wheel be equally efficient rotating in either direction.

To preserve uniform cross section, as nearly as may be, throughout the web of the tread portion of the wheel for the sake of symmetry, economy in the use of material, and ease in molding, the inclined triangular planes 10, 11, and 12 should be arranged substantially as shown; although variations to suit special demands will suggest themselves to those skilled in this art, in putting this invention into practice. The angles of the planes 6, 10, 11 and 12 all incline toward the rim of the wheel, thereby presenting resistance to the sinking of the wheel into the soft ground by exerting a lateral packing pressure against that portion of the ground in contact with these planes on the ground portion of the wheel; furthermore this peculiar arrangement of angles reduces the tendency of the wheel to lift the ground in leaving it, while having the opposite tendency in entering. In soft sticky land adhesion might be sufficient to cause the tread to lift out a section equal to the space between the planes 6 a very serious objection, unless the structure of the tread had inherent tendencies to dislodge such an obstruction. A valuable feature of this invention is this inherent tendency to disgorge obstructions in the tread. A section of mud sufficiently adhesive to be carried over would be dislodged when it came in contact with the ground in front of the wheel; this is caused by the wedging action of the inside of the plane 11; as the apex of the section of mud is forced up the incline, contact is broken between the planes 10 and 12, and there being no lateral resistance between the planes 6 the obstruction is forced free of the tread as the latter sinks into the ground. Normally the wheel is the moving object and the ground stationary, in the case of the obstruction the positions are reversed and the most powerful principle in mechanics, the wedge, is brought to bear against the obstruction. In simple terms the tread is a series of wedges entering the ground against its lateral resistance; in contradistinction to that class of treads presenting a superficial area to the ground on a plane parallel to the plane of the ground surface.

Believing this description to be complete, correct and sufficient for those competent to put this invention into practice, what I claim and desire to secure by Letters Patent is:

1. A traction wheel having a narrow rim, a tread including oppositely open triangles formed by the base lines of inclined triangular planes, having their apices in said rim; and inverted triangular planes whose base line extends between said apices, and whose apex joins the contiguous apex of said open triangles.

2. A traction wheel having a narrow rim, a tread including oppositely open triangles formed by the base lines of inclined triangular planes having their apices in said rim, and joined by a triangular plane whose base line extends between said apices, and whose apex joins the contiguous apex of said open triangles; and radial planes extending laterally from said apices.

3. A traction wheel having a narrow rim, inclined planes extending from said rim to form substantially triangular, pyramidal, open spaces on opposite sides of said wheel, and radial planes extending laterally from the apices of said triangular spaces, whereby the peripheral tread of the wheel presents a series of conjoined Y shaped lines facing in alternately opposite directions.

4. A traction wheel having a narrow rim and a zig-zag tread, inclined planes extending from said rim to said tread to form polygonal spaces on alternately opposite sides of said wheel, and radial planes extending laterally from alternate sides of said tread.

5. A traction wheel having a narrow rim and a zig-zag tread wider than said rim; radial planes extending from said tread to said rim; radial planes extending laterally beyond said tread presents a series of conjoined Y shaped lines open in alternately opposite directions.

6. A traction wheel having a narrow rim and a tread wherein the periphery presents a series of conjoined Y shaped lines open in alternately opposite directions; and radial planes extending from said tread to said rim.

7. A traction wheel having a narrow rim; a tread wider than said rim and spaced therefrom, and planes interposed between said rim and said tread, whereby the periphery of the tread presents a series of conjoined Y shaped lines open in alternately opposite directions.

In testimony whereof, I have hereunto set my hand at San Francisco, this 9th day of May, 1913.

DENNIS W. McLAUGHLIN.

In presence of—
 BALDWIN VALE,
 THEO. LARSEN,
 GENEVIEVE S. DONELIN.